United States Patent
Takahashi

(10) Patent No.: US 11,989,281 B2
(45) Date of Patent: May 21, 2024

(54) WHITE LIST GENERATION DEVICE, CONTROL METHOD, AND PROGRAM

(71) Applicant: NEC Corporation, Tokyo (JP)

(72) Inventor: Eiji Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 209 days.

(21) Appl. No.: 17/435,834

(22) PCT Filed: Dec. 11, 2019

(86) PCT No.: PCT/JP2019/048413
§ 371 (c)(1),
(2) Date: Sep. 2, 2021

(87) PCT Pub. No.: WO2020/183828
PCT Pub. Date: Sep. 17, 2020

(65) Prior Publication Data
US 2022/0156362 A1    May 19, 2022

(30) Foreign Application Priority Data

Mar. 12, 2019 (JP) ................................. 2019-044977

(51) Int. Cl.
*G06F 21/53* (2013.01)
*G06F 8/61* (2018.01)
(Continued)

(52) U.S. Cl.
CPC ............... *G06F 21/53* (2013.01); *G06F 8/61* (2013.01); *G06F 9/45533* (2013.01); *G06F 21/54* (2013.01); *G06F 21/62* (2013.01)

(58) Field of Classification Search
CPC ........ G06F 21/53; G06F 8/61; G06F 9/45533; G06F 21/54; G06F 21/62; G06F 9/45558;
(Continued)

(56) References Cited

U.S. PATENT DOCUMENTS

2009/0300599 A1    12/2009   Piotrowski
2010/0043073 A1    2/2010    Kuwamura
(Continued)

FOREIGN PATENT DOCUMENTS

| JP | 2010-044613 A | 2/2010 |
|---|---|---|
| JP | 2017-021777 A | 1/2017 |
| WO | 2010/100769 A1 | 9/2010 |

OTHER PUBLICATIONS

Extended European Search Report for EP Application No. 19919477.0 dated Apr. 7, 2022.
(Continued)

*Primary Examiner* — Bruce S Ashley
(74) *Attorney, Agent, or Firm* — Sughrue Mion, PLLC

(57) ABSTRACT

A white list generation apparatus (2000) acquires a generation request (70). The generation request (70) includes hardware configuration information (74) indicating hardware performance of a target virtual machine (20) and software configuration information (72) indicating software to be installed on the target virtual machine (20). The white list generation apparatus (2000) generates or determines a machine (90) configured with hardware with performance higher than hardware performance indicated in the hardware configuration information (74). The white list generation apparatus (2000) further installs software indicated in the software configuration information (72) onto the machine (90). Then, the white list generation apparatus (2000) generates a white list (60), based on a content of a storage apparatus in the machine (90) after completion of the installation.

13 Claims, 10 Drawing Sheets

(51) Int. Cl.
*G06F 9/455* (2018.01)
*G06F 21/54* (2013.01)
*G06F 21/62* (2013.01)

(58) Field of Classification Search
CPC ....... G06F 2009/45562; G06F 21/6218; H04L 63/101
See application file for complete search history.

(56) References Cited

U.S. PATENT DOCUMENTS

| | | |
|---|---|---|
| 2011/0047541 A1 | 2/2011 | Yamaguchi et al. |
| 2015/0339475 A1* | 11/2015 | Feroz ................... G06F 21/566 726/23 |
| 2016/0162685 A1 | 6/2016 | Feroz et al. |
| 2017/0004310 A1 | 1/2017 | Ivanov et al. |
| 2019/0057214 A1 | 2/2019 | Xia et al. |
| 2019/0227828 A1* | 7/2019 | Zhang ................... G06F 9/4555 |
| 2020/0177452 A1* | 6/2020 | Schardt ............... H04L 41/0813 |

OTHER PUBLICATIONS

Corrected Extended European Search Report for EP Application No. 19919477.0 dated Apr. 29, 2022.
International Search Report for PCT Application No. PCT/JP2019/048413, dated Feb. 10, 2020.

* cited by examiner

WHITE LIST GENERATION DEVICE, CONTROL METHOD, AND PROGRAM

This application is a National Stage Entry of PCT/JP2019/048413 filed on Dec. 11, 2019, which claims priority from Japanese Patent Application 2019-044977 filed on Mar. 12, 2019, the contents of all of which are incorporated herein by reference, in their entirety.

TECHNICAL FIELD

The present invention relates to a service providing a virtual machine.

BACKGROUND ART

Systems providing computer resources through the Internet have been provided. For example, such a system is provided by using a virtualization technology. First, a system user requests use of a virtual machine having desired processing performance. A virtual machine having the requested processing performance is generated in the system accepting the request. By accessing the virtual machine through the Internet, the user can use a virtual machine having the desired processing performance (that is, a desired computer resource).

Further, file access control is used in a computer system for enhancing safety in terms of security. For example, a technology of defining a list of files access to which is permitted (a white list) and performing file access control using the white list has been developed. For example, PTL 1 discloses a system preregistering an application or the like existence and operation of which are permitted in a white list and performing file access control by using the white list.

RELATED DOCUMENT

Patent Document

PTL 1: Japanese Patent Application Publication No. 2017-021777

SUMMARY OF THE INVENTION

Technical Problem

The present inventor has examined introduction of file access control by a white list into a system providing a virtual machine. Then, the present inventor has found that enhanced efficiency in processing of generating a white list is necessary for improving convenience of the system. The aforementioned patent literature does not mention introduction of file access control by a white list into a system providing a virtual machine and does not mention necessity for enhanced efficiency in processing of generating a white list either.

The present invention has been made in view of the aforementioned problems, and an object thereof is to provide a technology for improving convenience of a system providing a virtual machine.

Solution to Problem

A white list generation apparatus according to the present invention includes: 1) an acquisition unit acquiring a generation request including hardware configuration information indicating hardware performance of a virtual machine and software configuration information indicating software to be installed on the virtual machine; and 2) a white list generation unit generating a white list representing a file access to which is permitted in the virtual machine.

The white list generation unit installs software indicated in the acquired software configuration information onto a machine having hardware performance higher than hardware performance indicated in the hardware configuration information and generates the white list, based on a content of a storage apparatus in the machine after the installation.

A control method according to the present invention is executed by a computer. The control method includes: 1) an acquisition step of acquiring a generation request including hardware configuration information indicating hardware performance of a virtual machine and software configuration information indicating software to be installed on the virtual machine; and 2) a white list generation step of generating a white list representing a file access to which is permitted in the virtual machine.

The white list generation step installs software indicated in the acquired software configuration information onto a machine having hardware performance higher than hardware performance indicated in the hardware configuration information and generates the white list, based on a content of a storage apparatus in the machine after the installation.

A program according to the present invention causes a computer to execute each step included in the control method according to the present invention.

Advantageous Effects of Invention

The present invention provides a technology for improving convenience of a system providing a virtual machine.

DESCRIPTION OF EMBODIMENTS

Example embodiments of the present invention will be described below by using drawings. Note that, in every drawing, similar components are given similar signs, and description thereof is omitted as appropriate. Further, in each block diagram, each block represents a function-based configuration rather than a hardware-based configuration unless otherwise described.

First Example Embodiment

Outline

Figure 1:
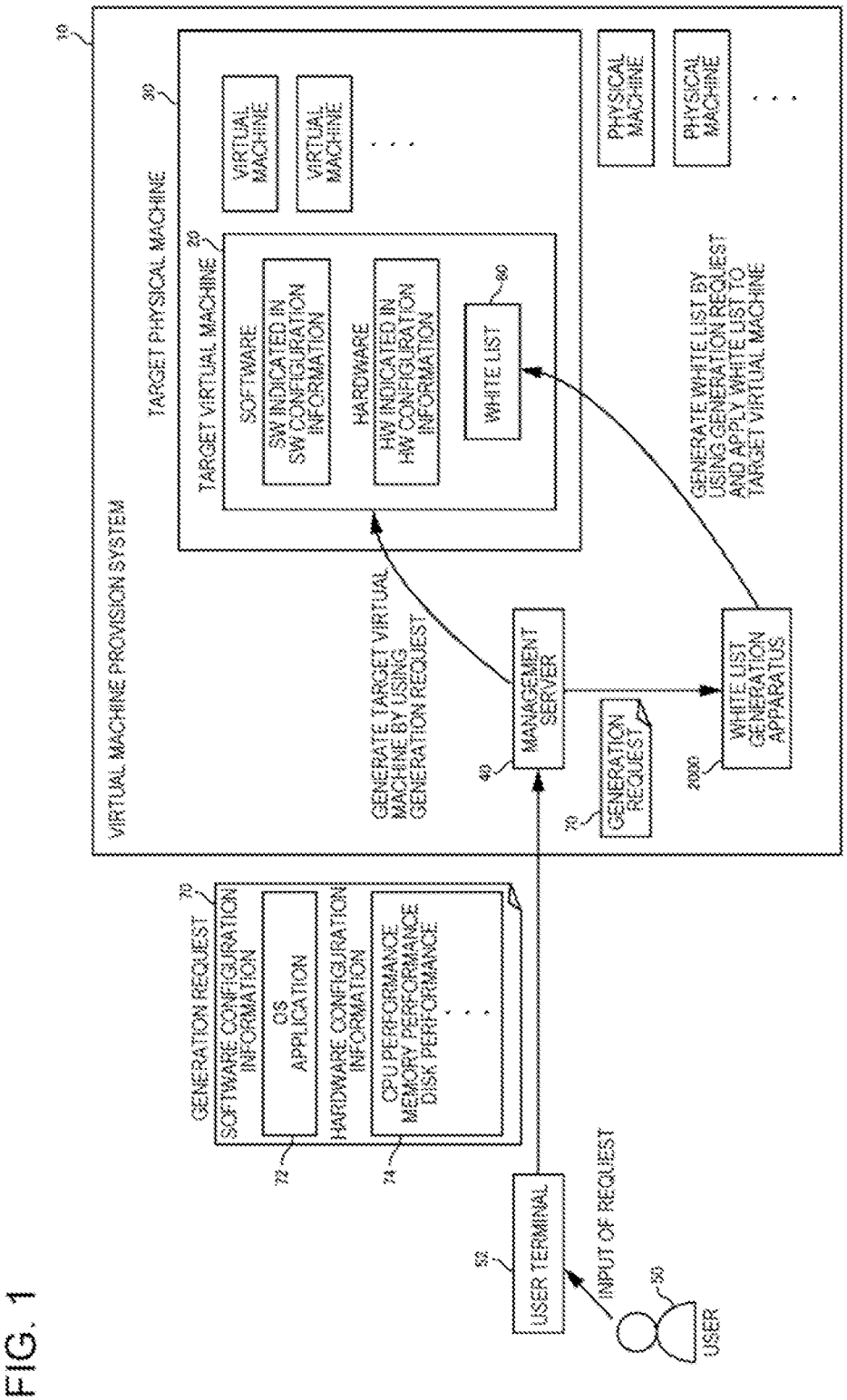
FIG. 1 is a diagram illustrating a use environment of a white list generation apparatus according to a first example embodiment.
Figure 2:
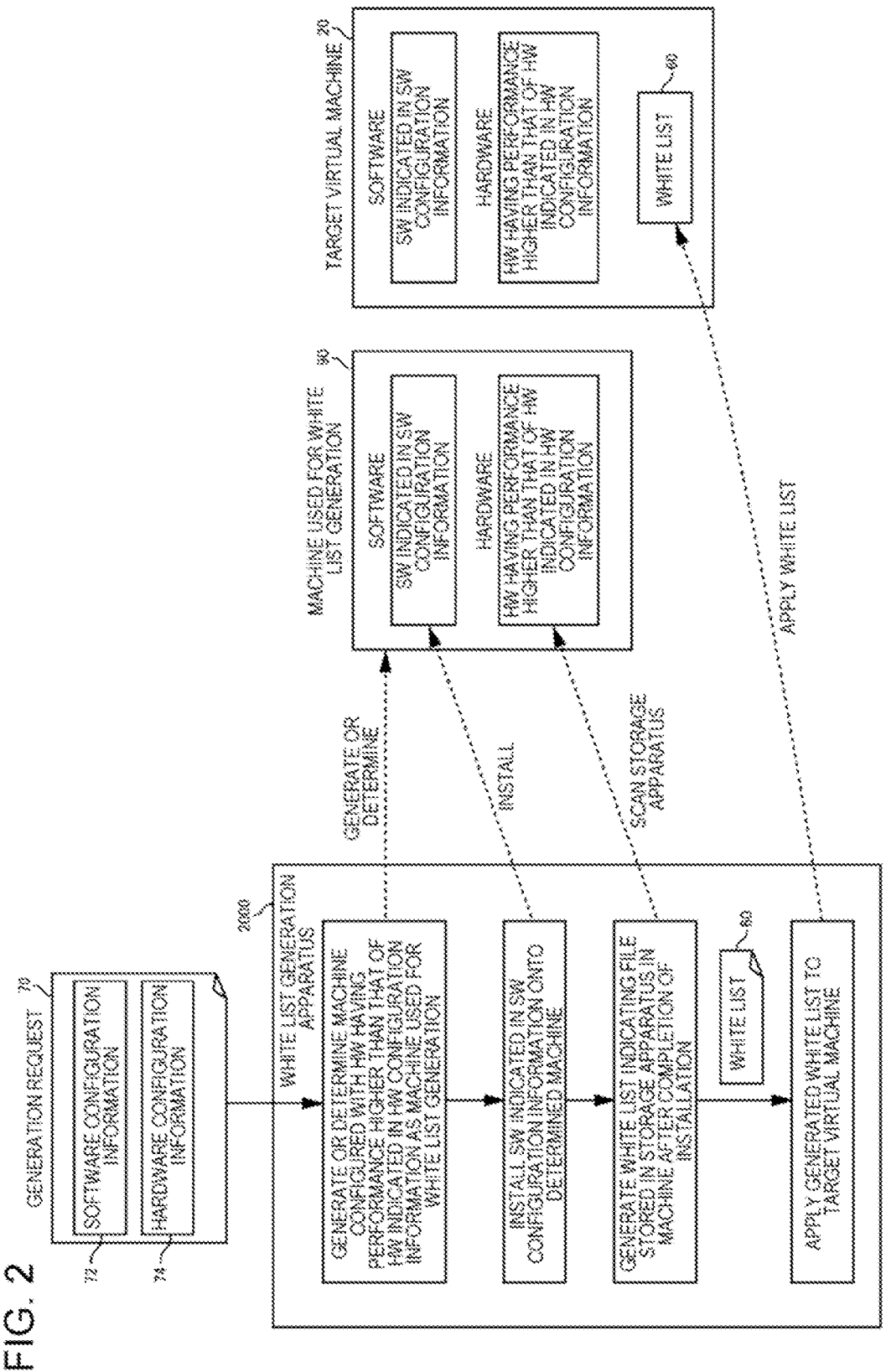
FIG. 2 is a diagram illustrating an outline of operation of the white list generation apparatus according to the first example embodiment.

First, an outline of a white list generation apparatus 2000 according to a first example embodiment will be described by using FIG. 1 and FIG. 2. FIG. 1 and FIG. 2 are exemplifications for ease of understanding the white list generation apparatus 2000, and functions of the white list generation apparatus 2000 are not limited to those described in FIG. 1 and FIG. 2.

FIG. 1 is a diagram illustrating a use environment of the white list generation apparatus 2000 according to the first example embodiment. The white list generation apparatus 2000 is used in a virtual machine provision system 10. The virtual machine provision system 10 is a system providing a user 50 with an environment for using a virtual machine. A virtual machine is a machine of a virtual nature being managed and executed by management software referred to as a virtual machine monitor (VMM), virtualization software, or the like and is configured with hardware of a virtual nature (virtual hardware). Examples of virtual hardware include a virtual CPU, a virtual memory (virtual main storage), a virtual disk (virtual auxiliary storage), and a virtual network interface. Virtual hardware is provided by using a part or the whole of physical hardware. In other words, a virtual machine operates by using a part or the whole of physical hardware constituting a physical machine. A virtual machine operating by using a part or the whole of physical hardware constituting a certain physical machine is hereinafter also expressed as "a virtual machine operating on the physical machine."

An OS can be installed on a virtual machine similarly to a regular physical machine. An OS on a virtual machine (hereinafter referred to as a guest OS) recognizes virtual hardware of the virtual machine similarly to an OS on a physical machine recognizing physical hardware. In other words, a guest OS on a virtual machine recognizes virtual hardware of the virtual machine just like physical hardware and operates accordingly. Therefore, other applications operating on the guest OS can operate using the virtual hardware just like physical hardware. Note that a technology for providing a virtual machine is an existing technology, and therefore further description of a virtual machine itself is omitted.

A user 50 transmits a generation request 70 specifying a configuration of a virtual machine to be used to a virtual machine provision system 10 by using a user terminal 52. Any computer such as a personal computer (PC) or a smartphone can be used as the user terminal 52. An apparatus having a function of receiving a generation request 70 transmitted from the user terminal 52 is herein referred to as a management server 40. The management server 40 may be provided as the same apparatus as the white list generation apparatus 2000 or may be provided as an apparatus different from the white list generation apparatus 2000.

In order to be distinguished from another virtual machine already operating in the virtual machine provision system 10, a virtual machine being generated by the management server 40, based on a received generation request 70, is hereinafter described as a target virtual machine 20.

A generation request 70 includes hardware configuration information 74 indicating a hardware configuration of a target virtual machine 20 and software configuration information 72 indicating a software configuration of the target virtual machine 20. The hardware configuration information 74 indicates information determining processing performance of each piece of virtual hardware constituting the target virtual machine 20. On the other hand, the software configuration information 72 indicates identification information of software (an OS or an application) to be installed on the target virtual machine 20. For example, identification information of software is a name and a version number of the software.

The management server 40 receiving a generation request 70 generates a target virtual machine 20 specified by the generation request 70. More specifically, the management server 40 determines a physical machine capable of generating the target virtual machine 20 and generates the target virtual machine 20 by allocating physical hardware of the determined physical machine to the target virtual machine 20. The determined physical machine is herein referred to as a target physical machine 30. A physical machine having hardware performance higher than hardware performance specified by the hardware configuration information 74 is used as the target physical machine 30. The management server 40 further installs each piece of software (an OS or an application) specified by the software configuration information 72 onto the target virtual machine 20. Thus, the user 50 can use the target virtual machine 20 having the configuration specified by the generation request 70.

A virtual machine operating in the virtual machine provision system 10 performs file access control using a white list 60. A white list 60 indicates identification information of a file presumed to be safe from a viewpoint of security. In other words, a file determined by identification information indicated by a white list 60 is a file presumed not to be software being a threat in terms of security, such as malware.

More specifically, when an OS or an application operating on a virtual machine attempts to access a file, whether identification information of the file being accessed is included in a white list 60 is determined in the virtual machine provision system 10. For example, when identification information of the file being accessed is indicated in the white list 60, the file access is permitted, and when the identification information of the file being accessed is not indicated in the white list 60, the file access is not permitted.

Note that a target of access control using a white list 60 may be just part of files. For example, it may be considered that only a specific type of file is determined as a target of access control or only a file under a specific directory is determined as a target of access control. For example, an executable file is employed as a specific type. In other words, access control is performed only on an executable file. Thus, execution of a dangerous program such as malware on a virtual machine can be prevented.

A white list 60 is generated for each virtual machine. A white list 60 generated for a certain virtual machine is hereinafter referred to as a white list 60 related to the virtual machine. Similarly, the white list 60 is referred to as a white list 60 related to the virtual machine.

The white list generation apparatus 2000 is an apparatus generating a white list 60 related to a target virtual machine 20. FIG. 2 is a diagram illustrating an outline of operation of the white list generation apparatus 2000 according to the first example embodiment. The white list generation apparatus 2000 acquires the aforementioned generation request 70. Note that, when the white list generation apparatus 2000 is provided as an apparatus different from the management server 40, the white list generation apparatus 2000 acquires the generation request 70 from the management server 40 (see FIG. 1).

The white list generation apparatus 2000 further generates a white list 60 by using the generation request 70. Specifically, the white list generation apparatus 2000 generates or determines a machine 90 configured with hardware with performance higher than hardware performance indicated in hardware configuration information 74. The white list generation apparatus 2000 further installs software indicated in software configuration information 72 onto the machine 90. Then, the white list generation apparatus 2000 generates a white list 60, based on a content of a storage apparatus in the machine 90 (a local disk in the machine 90) after completion of the installation. More specifically, the white list generation apparatus 2000 scans the storage apparatus in the machine 90 and generates a white list 60 indicating identification information of each file stored in the storage apparatus in the machine 90.

Files indicated by a white list 60 may be part of files stored in the storage apparatus in the target virtual machine 20. For example, when only an executable file is set as a target of access control as described above, files indicated by a white list 60 may only be executable files. Similarly, when only a file stored under a specific directory is set as a target of access control, a white list 60 only includes files stored under the directory.

A white list 60 generated by the white list generation apparatus 2000 is used for file access control in a target virtual machine 20. Causing a certain virtual machine to perform file access control by using a certain white list 60 is also expressed as "applying the white list 60 to the virtual machine." Accordingly, it can be said that the white list generation apparatus 2000 is an apparatus generating a white list 60 related to a target virtual machine 20 and applying the generated white list 60 to the target virtual machine 20.

Advantageous Effect

As described above, file access control using a white list 60 is performed in a virtual machine operating in the virtual machine provision system 10. In order to achieve the file access control, a user 50 cannot use a target virtual machine 20 until generation of a white list 60 is completed. For this reason, when generation of a white list 60 takes a long time, convenience of the target virtual machine 20 (convenience of the virtual machine provision system 10) for the user 50 is decreased. Therefore, it is preferable to shorten the time required for generation of a white list 60 as much as possible.

The following method may be considered as a simple method of generating a white list 60. First, a target virtual machine 20 is started on a target physical machine 30, and software indicated in software configuration information 72 is installed on the started target virtual machine 20. Then, by scanning a storage apparatus in the target virtual machine 20 after completion of the installation, a white list 60 indicating each file stored in the storage apparatus is generated.

On the other hand, the white list generation apparatus 2000 generates a white list 60 by a method taking less time to generate a white list 60 compared with a case of using the aforementioned simple method. Specifically, the white list generation apparatus 2000 generates a white list 60 by using a machine 90 with higher hardware performance than that of the target virtual machine 20 in place of the target virtual machine 20. Since hardware performance of the machine 90 is higher than that of the target virtual machine 20, the time required for installing the software onto the machine 90 is shorter than the time required for installing the software onto the target virtual machine 20. Further, the time required for scanning a storage apparatus in the machine 90 is also shorter than the time required for scanning the storage apparatus in the target virtual machine 20.

From the above, generation of a white list 60 using the machine 90 can be performed faster than generation of a white list 60 using the target virtual machine 20. Accordingly, the time required for generation of a white list 60 required for file access control in the target virtual machine 20 can be shortened by using the white list generation apparatus 2000. Consequently, the time until the user 50 becomes able to use the target virtual machine 20 can be shortened compared with the case of using the aforementioned simple method, and therefore convenience of the target virtual machine 20 (and by extension convenience of the virtual machine provision system 10) can be increased.

The white list generation apparatus 2000 according to the present example embodiment will be described in more detail below.

Functional Configuration Example

Figure 3:
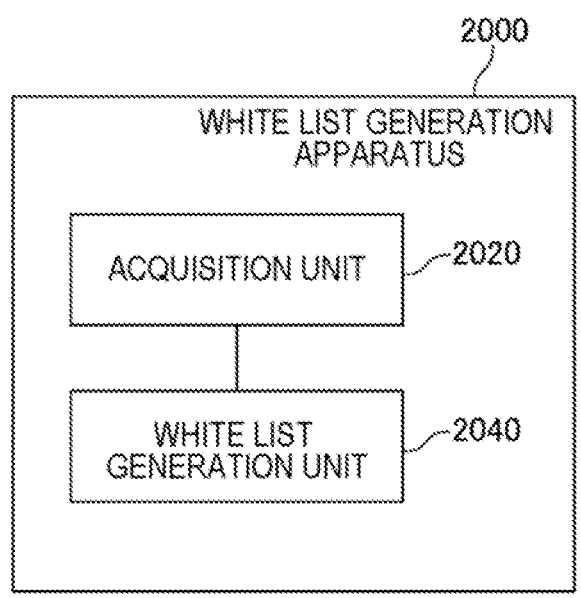
FIG. 3 is a diagram illustrating a functional configuration of the white list generation apparatus according to the first example embodiment.

FIG. 3 is a diagram illustrating a functional configuration of the white list generation apparatus 2000 according to the first example embodiment. The white list generation apparatus 2000 includes an acquisition unit 2020 and a white list generation unit 2040. The acquisition unit 2020 acquires a generation request 70. As described above, the generation request 70 includes hardware configuration information 74 and software configuration information 72. The white list generation unit 2040 generates or determines a machine 90 having hardware performance higher than hardware performance indicated in the hardware configuration information 74. Then, the white list generation unit 2040 installs software indicated in the software configuration information 72 onto the machine 90. Then, the white list generation unit 2040 generates a white list 60 indicating a file stored in a storage apparatus in the machine 90.

Hardware Configuration Example of White List Generation Apparatus 2000

Each functional component in the white list generation apparatus 2000 may be provided by hardware (such as a hard-wired electronic circuit) providing each functional component or may be provided by a combination of hardware and software (such as a combination of an electronic circuit and a program controlling the circuit). The case of providing each functional component in the white list generation apparatus 2000 by a combination of hardware and software will be further described below.

Figure 4:
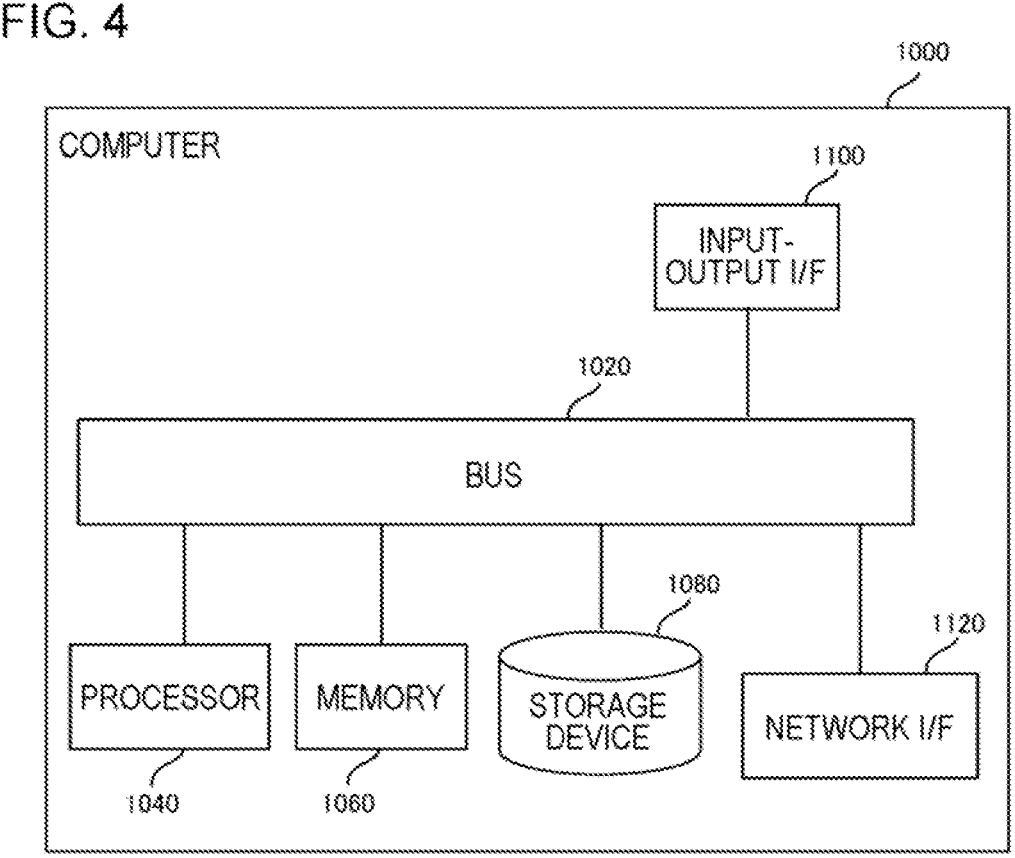
FIG. 4 is a diagram illustrating a computer for providing the white list generation apparatus.

FIG. 4 is a diagram illustrating a computer 1000 for providing the white list generation apparatus 2000. The computer 1000 is any computer. For example, the computer 1000 is a stationary-type computer such as a personal computer (PC) or a server machine. In addition, for example, the computer 1000 is a portable computer such as a smartphone or a tablet terminal. Note that the computer 1000 may be a dedicated computer designed for providing the white list generation apparatus 2000 or may be a general-purpose computer.

The computer 1000 includes a bus 1020, a processor 1040, a memory 1060, a storage device 1080, an input-output interface 1100, and a network interface 1120. The bus 1020 is a data transmission channel for the processor 1040, the memory 1060, the storage device 1080, the input-output interface 1100, and the network interface 1120 to transmit and receive data to and from one another. The method of interconnecting the processor 1040 and other components is not limited to a bus connection.

Examples of the processor 1040 include various processors such as a central processing unit (CPU), a graphics processing unit (GPU), and a field-programmable gate array (FPGA). The memory 1060 is a main storage provided by using a random access memory (RAM) or the like. The storage device 1080 is an auxiliary storage provided by using a hard disk, a solid state drive (SSD), a memory card, a read only memory (ROM), or the like.

The input-output interface 1100 is an interface for connecting the computer 1000 to an input-output device. For example, the input-output interface 1100 is connected to an input apparatus such as a keyboard and an output apparatus such as a display apparatus.

The network interface 1120 is an interface for connecting the computer 1000 to a communication network. Examples of the communication network include a local area network (LAN) and a wide area network (WAN). The method of connecting the network interface 1120 to the communication network may be a wireless connection or a wired connection. For example, the computer 1000 is communicably connected to various machines such as a target virtual machine 20, a target physical machine 30, the management server 40, and a machine 90 through the network interface 1120.

The storage device 1080 stores a program module providing each functional component in the white list generation apparatus 2000. By reading each program module into the memory 1060 and executing the program module, the processor 1040 provides a function related to the program module.

Flow of Processing

Figure 5:
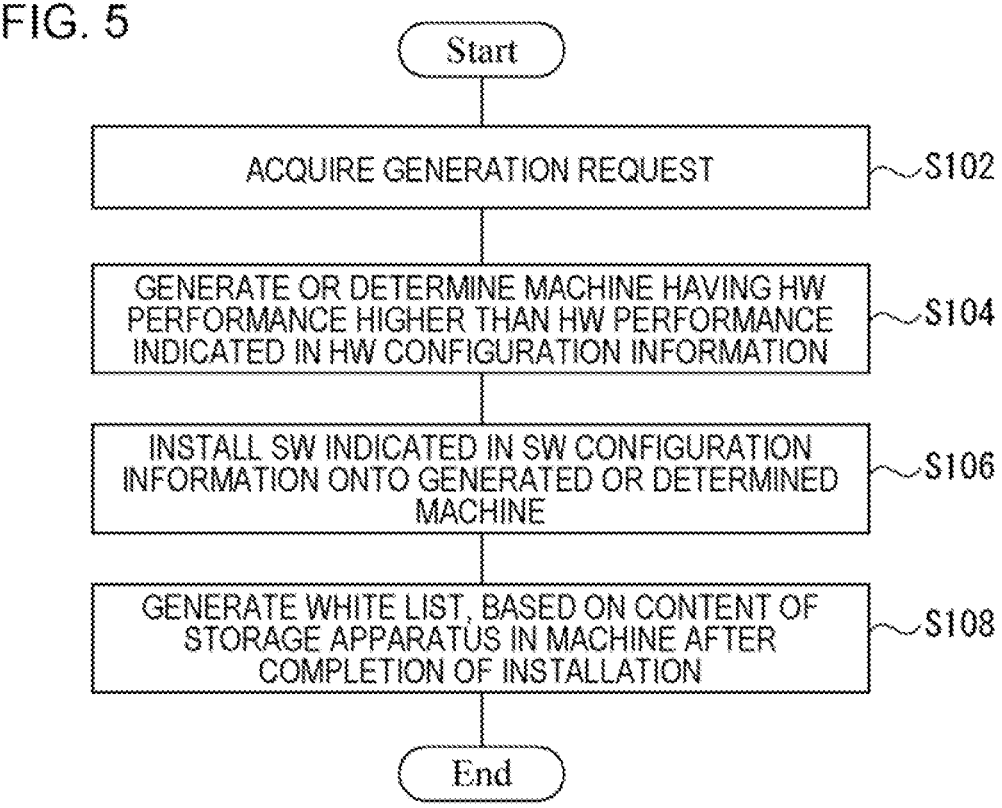
FIG. 5 is a flowchart illustrating a flow of processing executed by the white list generation apparatus according to the first example embodiment.

FIG. 5 is a flowchart illustrating a flow of processing executed by the white list generation apparatus 2000 according to the first example embodiment. The acquisition unit 2020 acquires a generation request 70 (S102). The white list generation unit 2040 generates or determines a machine 90 having hardware performance higher than hardware performance indicated in hardware configuration information 74 (S104). The white list generation unit 2040 installs software indicated in software configuration information 72 onto the machine 90 (S106). The white list generation unit 2040 generates a white list 60, based on a content of a storage apparatus in the machine 90 (S108).

Example of Flow Using System 10

Figure 6:
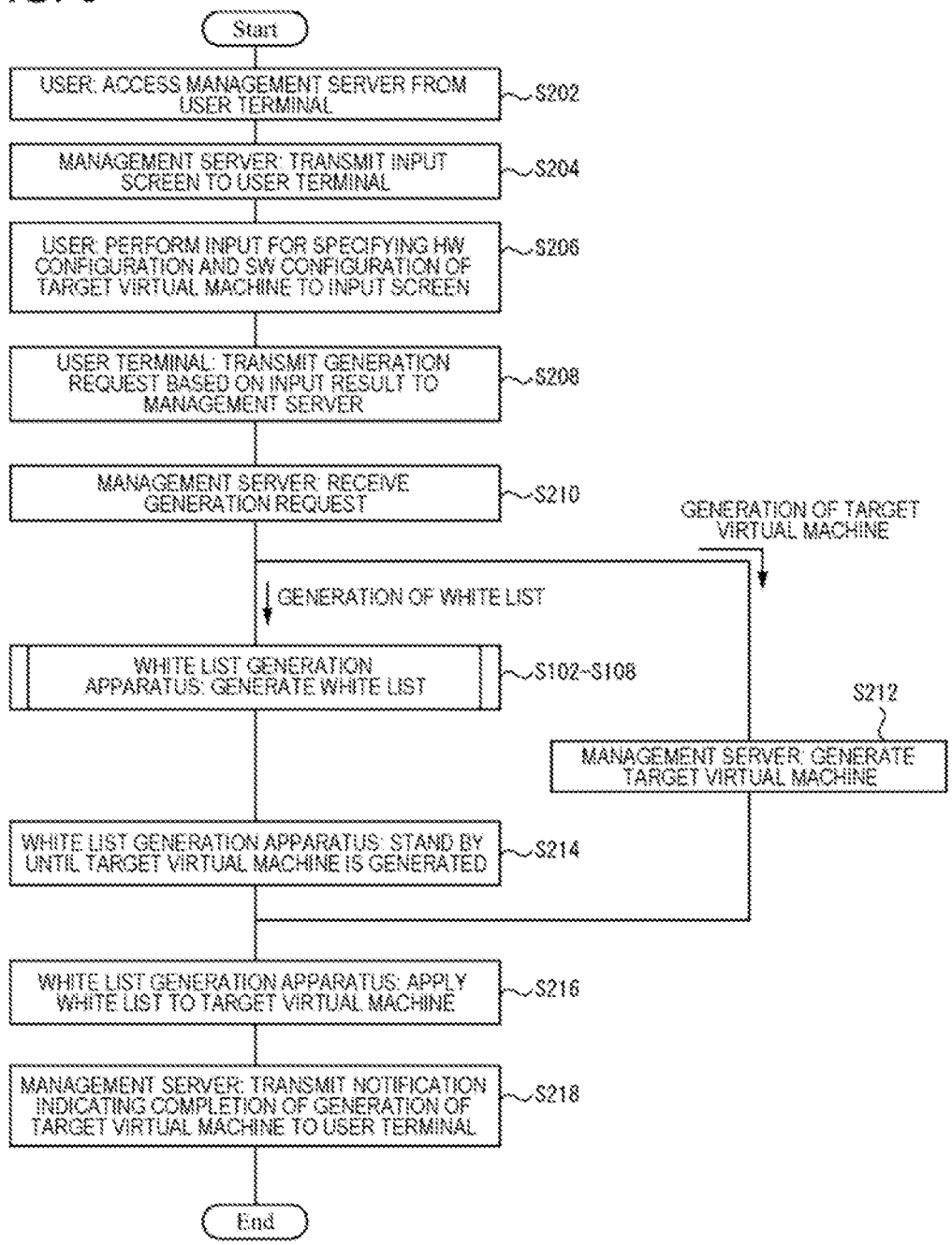
FIG. 6 is a diagram illustrating a flow of a user using the virtual machine provision system.

FIG. 6 is a diagram illustrating a flow of a user 50 using the virtual machine provision system 10. The user 50 accesses the management server 40 by using a user terminal 52 (S202). For example, the management server 40 provides a Web site being an interface for using the virtual machine provision system 10. In this case, the user 50 accesses the Web site from the user terminal 52.

The management server 40 transmits, to the user terminal 52, an input screen that can be used for requesting generation of a target virtual machine 20 (S204). When the management server 40 provides the Web site, the input screen is provided as a Web page. The user 50 performs input for specifying a hardware configuration and a software configuration of the target virtual machine 20 to the input screen displayed on the user terminal 52 (S206). Consequently, a generation request 70 including hardware configuration information 74 indicating the hardware configuration of the target virtual machine 20 specified by the user 50 and software configuration information 72 indicating the software configuration of the target virtual machine 20 specified by the user 50 is transmitted from the user terminal 52 to the management server 40 (S208).

The management server 40 receives the generation request 70 (S210). It is preferable that generation of a white list 60 and generation of the target virtual machine 20 be performed in parallel after reception of the generation request 70. The management server 40 generates the target virtual machine 20 having the hardware configuration indicated in the hardware configuration information 74 and the software configuration indicated in the software configuration information 72 (S212). On the other hand, the white list generation apparatus 2000 performs a series of processing operations (S102 to S108) for generating a white list. Subsequently, the white list generation apparatus 2000 stands by until generation of the target virtual machine 20 is completed (S214). For example, by receiving a notification that generation of a target virtual machine 20 is completed from the management server 40, the white list generation apparatus 2000 detects that the generation of the target virtual machine 20 is completed.

The white list generation apparatus 2000 applies the white list 60 to the target virtual machine 20 (S216). The management server 40 transmits a notification indicating that the generation of the target virtual machine 20 is completed to the user terminal 52 (S218). The notification can be made by any method.

The aforementioned description using FIG. 6 is an exemplification for ease of imaging a usage method of the virtual machine provision system 10 and does not limit the configuration or a usage method of the virtual machine provision system 10. For example, the method of the user 50 using the virtual machine provision system 10 is not necessarily limited to the method of using the system through a Web site. For example, a dedicated application for using the virtual machine provision system 10 may be installed on the user terminal 52, and data may be exchanged between the user terminal 52 and the management server 40 through the application.

Acquisition of Generation Request 70: S102

The acquisition unit 2020 acquires a generation request 70 (S102). The generation request 70 is a request requesting generation of a target virtual machine 20 and includes hardware configuration information 74 and software configuration information 72. The hardware configuration information 74 includes information specifying hardware performance of the target virtual machine 20. For example, hardware configuration information 74 includes CPU performance (the number of virtual CPUs and a clock frequency), a memory capacity, and an auxiliary storage (virtual disk) capacity. For example, the user 50 specifies the hardware configuration of the target virtual machine 20 by inputting information such as CPU performance to the aforementioned input screen provided by the management server 40 (S206).

Instead of causing the user 50 to individually specify each piece of hardware, a plurality of patterns of a combination of pieces of hardware may be prepared and the user 50 may select one of the patterns. For example, two choices being a high-performance machine and a low-performance machine are prepared, and the management server 40 provides the user 50 with an input screen on which either choice can be specified.

The software configuration information 72 is information indicating software to be installed on the target virtual machine 20. The software configuration information 72 includes one or more items out of identification information of an OS and identification information of an application. For example, identification information of an OS is determined by a name and a version number of the OS. Similarly, identification information of an application is determined by a name and a version number of the application. For example, the management server 40 provides the user 50 with an input screen on which an OS and an application can be selected and installs an OS and an application selected on the input screen onto the target virtual machine 20.

Note that an OS to be installed on the target virtual machine 20 may be fixed and be unchangeable by the user 50. In this case, the user 50 can specify one or more applications to be installed on the target virtual machine 20.

On the other hand, an application to be installed on the target virtual machine 20 may be fixed and be unchangeable by the user 50. In this case, the user 50 can specify an OS to be installed on the target virtual machine 20.

Note that, instead of causing the user 50 to individually specify each piece of software, a plurality of patterns of a combination of pieces of software may be prepared and the user 50 may select one of the patterns, similarly to specification of hardware. Furthermore, a plurality of patterns of a combination of hardware and software may be prepared and the user 50 may select one of the patterns. For example, four patterns being "high-performance machine: software configuration A," "high-performance machine: software configuration B," "low-performance machine: software configuration A," and "low-performance machine: software configuration B" are prepared and the user 50 selects one of the patterns.

Figure 7:
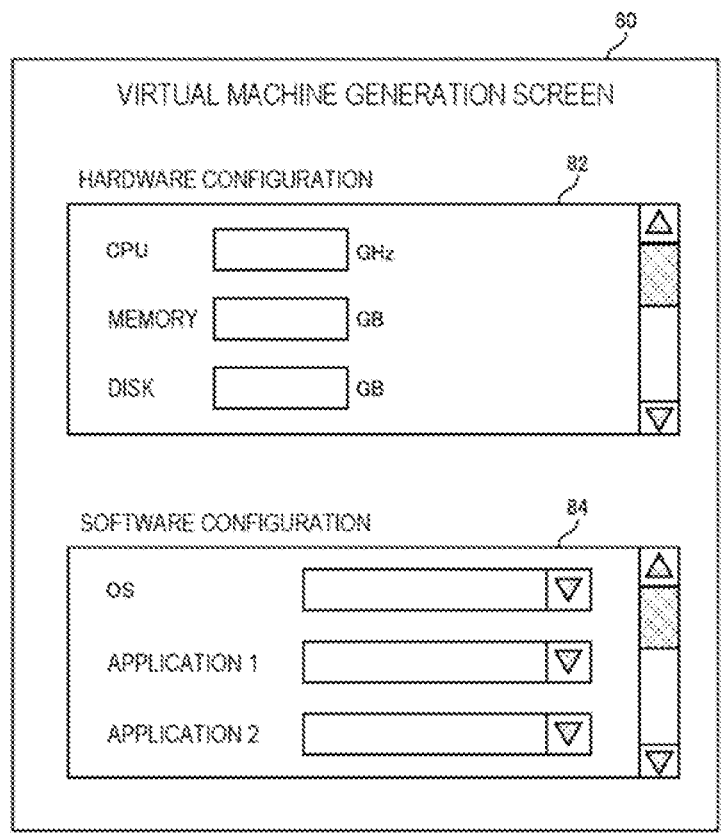
FIG. 7 is a diagram illustrating an input screen for generating a generation request.

FIG. 7 is a diagram illustrating an input screen 80 for generating a generation request 70. The input screen 80 includes an input area 82 for specifying a hardware configuration and an input area 84 for specifying a software configuration. The input area 82 allows specification of performance such as a CPU by key entry into a text box. The input area 84 allows selection of an OS and an application by drop buttons. The specification method of hardware and software is not limited to the example described above.

A slider is provided in each of the input area 82 and the input area 84 and allows specification of another element not indicated in FIG. 7. For example, by moving the slider in the input area 82 downward, settings for an input device and a network can be further specified. By moving the slider in the input area 84 downward, a third application and beyond can be further specified.

There are various methods for acquiring a generation request 70 by the acquisition unit 2020. It is assumed that the white list generation apparatus 2000 is provided by the same apparatus as the management server 40. In this case, the acquisition unit 2020 acquires a generation request 70 by receiving the generation request 70 transmitted from the user terminal 52. On the other hand, it is assumed that the white list generation apparatus 2000 is provided by an apparatus different from the management server 40. In this case, the acquisition unit 2020 acquires, from the management server 40, a generation request 70 received by the management server 40 from the user terminal 52. For example, acquisition unit 2020 acquires a generation request 70 by receiving the generation request 70 transmitted from the management server 40.

Generation or Determination of Machine 90: S104

The white list generation unit 2040 generates or determines a machine 90 (S104). The machine 90 is a machine used for generation of a white list 60. The machine 90 may be a physical machine or a virtual machine. Further, when the machine 90 is provided as a virtual machine, a physical machine operating the machine 90 may be the same as a physical machine operating the target virtual machine 20 or may be a different physical machine. However, in order to avoid affecting the processing of generating the target virtual machine 20, it is preferable to operate the machine 90 on a physical machine different from a physical machine operating the target virtual machine 20.

The white list generation unit 2040 causes performance of the machine 90 to be higher than performance of the target virtual machine 20 with regard to at least hardware with a high probability of affecting the time required for generation of a white list 60. Examples of hardware with a high probability of affecting the time required for generation of a white list 60 include a CPU and a memory. Hardware performance of which should be higher than performance of the target virtual machine 20 (that is, performance indicated in the hardware configuration information 74) in the machine 90 is hereinafter referred to as target hardware.

Method of Determining Hardware
Method of Determining CPU Performance

When a CPU is determined to be target hardware, the white list generation unit 2040 causes an index value representing CPU performance of the machine 90 to be higher than an index value representing CPU performance of the target virtual machine 20. An index value representing CPU performance is hereinafter referred to as a CPU performance index value. For example, a CPU performance index value is a CPU frequency. In this case, for example, the white list generation unit 2040 causes the CPU frequency of the machine 90 to be higher than the CPU frequency of the target virtual machine 20.

However, in a case of a virtual CPU, an index corresponding to a CPU frequency may be determined by the frequency of a physical CPU in a physical machine operating a virtual machine and a share of the physical CPU allocated to the virtual CPU. In this case, for example, the white list generation unit 2040 handles a value acquired by multiplying the frequency of the physical CPU by a share allocated to the virtual machine (a theoretical value of the frequency of the virtual CPU) as the frequency of the virtual CPU in the virtual machine. For example, in a case of operating a virtual machine on a physical machine with a physical CPU at 3 GHz, it is assumed that a share of ⅓ of the physical CPU is allocated to the virtual machine. In this case, the white list generation unit 2040 assumes the frequency of a virtual CPU in the virtual machine to be 1.0 GHz [3.0 GHz*(⅓)].

Note that a plurality of CPUs may exist in a virtual machine or a physical machine. In this case, for example, the white list generation unit 2040 handles the sum of frequencies of CPUs included in a machine as a CPU performance index value of the machine. For example, it is assumed that a virtual machine operates on a physical machine including two physical CPUs the frequency of each is 3 GHz. It is further assumed in this case that the virtual machine includes two virtual CPUs each of which is allocated with a share of ⅓ of the physical CPU. In this case, the white list generation unit 2040 handles the sum of frequencies of the two virtual CPUs being 2.0 GHz (1.0 GHz+1.0 GHz) as a CPU performance index value of the virtual machine.

A CPU performance index value may be determined by also using an element other than a CPU frequency. For example, a function for computing a CPU performance index value, based on various elements of a CPU (such as a frequency, the number of CPUs, the number of cores, and the size of a cache memory), is predetermined. The white list generation unit 2040 computes a CPU performance index value by using the function.

When computing a performance index value of a physical CPU, for example, the white list generation unit 2040 computes the CPU performance index value of the physical CPU by substituting a value of each element determined by a specification of the physical CPU into the aforementioned function. On the other hand, when computing a CPU performance index value of a virtual CPU, for example, the white list generation unit 2040 computes the CPU performance index value of the virtual CPU by computing a CPU performance index value of a physical CPU in a physical machine operating the virtual machine by using the aforementioned function and multiplying the CPU performance index value by a share of the virtual CPU.

Method of Determining Memory Performance

When a memory is determined to be target hardware, the white list generation unit 2040 causes an index value representing memory performance of the machine 90 to be higher than an index value representing memory performance of the target virtual machine 20. An index value representing a memory performance is hereinafter referred to as a memory performance index value. For example, a memory performance index value is a memory capacity. In this case, for example, the white list generation unit 2040 causes the memory capacity of the machine 90 to be greater than the memory capacity of the target virtual machine 20.

For example, the memory capacity of a virtual machine is determined by the memory capacity of a physical machine operating the virtual machine and a share of the memory capacity allocated to the virtual machine. In this case, for example, the white list generation unit 2040 handles a value acquired by multiplying the capacity of a physical memory by a share of the memory allocated to a virtual machine (a theoretical value of the memory capacity of the virtual machine) as a memory capacity of the virtual machine. For example, in a case of operating a virtual machine on a physical machine with a memory capacity of 16 GB, it is assumed that a share of ¼ of the physical memory is allocated to the virtual machine. In this case, the white list generation unit 2040 assumes the memory capacity of the virtual machine to be 4 GB [16 GB*(¼)].

A memory performance index value may be determined by also using an element other than a memory capacity. For example, a function for computing a memory performance index value, based on each element of a memory (such as a memory capacity and a memory bandwidth) is predetermined. The white list generation unit 2040 computes a memory performance index value by using the function.

When computing a memory performance index value of a physical memory, for example, the white list generation unit 2040 computes the memory performance index value of the physical memory by substituting a value of each element determined by a specification of the physical memory into the aforementioned function. On the other hand, when computing a memory performance index value of a memory in a virtual machine, for example, the white list generation unit 2040 computes the performance index value of the memory in the virtual machine by computing a memory performance index value of a memory in a physical machine operating the virtual machine by using the aforementioned function and multiplying the memory performance index value by a share of the memory in the virtual machine.

Other Hardware

Target hardware is not limited to a CPU and a memory. Performance of other hardware can be determined by an index value representing performance of the hardware, similarly to a CPU or a memory.

Method of Generating or Determining Machine 90

As described above, a machine 90 may be provided as a physical machine or as a virtual machine. A method of generating or determining a machine 90 will be described below for each of a case of providing a machine 90 as a physical machine and a case of providing a machine 90 as a virtual machine.

Case of Providing Machine 90 as Physical Machine

When a machine 90 is provided as a physical machine, a physical machine available as the machine 90 is previously prepared. In this case, for example, a plurality of physical machines, hardware performance varying for each physical machine, are prepared. The white list generation unit 2040 determines a physical machine including hardware with performance higher than that of hardware indicated in hardware configuration information 74 as a machine 90.

For example, it is assumed that a CPU and a memory are handled as target hardware. In this case, the white list generation unit 2040 first computes a CPU performance index value and a memory performance index value for the target virtual machine 20 by using the hardware configuration information 74. Then, the white list generation unit 2040 determines a physical machine a CPU performance index value and a memory performance index value of which are higher than the CPU performance index value and the memory index value computed for the target virtual machine 20, respectively, as a machine 90.

It is assumed here that a plurality of physical machines each including hardware with performance higher than that of the hardware indicated in the hardware configuration information 74 are determined. In this case, the white list generation unit 2040 selects one of the plurality of determined physical machines and uses the selected physical machine as a machine 90. Any method may be used as the selection method of a physical machine. For example, the white list generation unit 2040 randomly selects one of the plurality of determined physical machine. In addition, for example, the white list generation unit 2040 selects a physical machine with the lowest hardware performance. In addition, for example, the white list generation unit 2040 selects a physical machine with the highest hardware performance.

Further, hardware performance of every physical machine available as a machine 90 may be set higher than hardware performance of a target virtual machine 20 having the maximum specifiable performance. In this case, regardless of which physical machine is selected as a machine 90, hardware performance of the machine 90 is higher than hardware performance of the target virtual machine 20. Therefore, in this case, the white list generation unit 2040 can determine any physical machine out of the prepared physical machines as a machine 90 without computing the aforementioned CPU performance index value and the like.

Case of Providing Machine 90 as Virtual Machine

When a machine 90 is provided as a virtual machine, the white list generation unit 2040 generates a machine 90 by generating target hardware of a target virtual machine 20 as virtual hardware having hardware performance higher than hardware performance indicated in hardware configuration information 74. For example, it is assumed that a CPU and a memory are handled as target hardware. In this case, the white list generation unit 2040 first computes a CPU performance index value and a memory performance index value for the target virtual machine 20 by using the hardware configuration information 74. Then, the white list generation unit 2040 generates a CPU and a memory of a machine 90 in such a way that the CPU performance index value and the memory performance index value of the machine 90 are higher than the CPU performance index value and the memory index value computed for the target virtual machine 20, respectively.

For example, the white list generation unit 2040 determines a value acquired by multiplying an index value representing hardware performance of the target virtual machine 20 by a predetermined coefficient α greater than 1 to be an index value representing hardware performance of a machine 90. It is assumed as an example that a CPU performance index value and a memory performance index value are a CPU frequency and a memory capacity, respectively. Further, the CPU frequency and the memory capacity of the target virtual machine 20 are denoted by F and M, respectively. In this case, the white list generation unit 2040 generates a machine 90 in such a way that the CPU frequency and the memory capacity of the machine 90 are αF and αM, respectively. Note that the coefficient α is previously stored in a storage apparatus accessible from the white list generation unit 2040.

In the case of operating a machine 90 as a virtual machine, a plurality of physical machines that can be used for operating the machine 90 may be prepared. In this case, the white list generation unit 2040 selects one physical machine allowing hardware performance of the machine 90 to be desired performance from among the plurality of physical machines. For example, the CPU frequency and the memory capacity of the machine 90 are denoted by αF and αM, respectively, similarly to the aforementioned example. In this case, the white list generation unit 2040 selects a physical machine satisfying a requirement that "a CPU frequency and a memory capacity allocable to the machine 90 are αF or greater and αM or greater, respectively," as a physical machine operating the machine 90. Note that, when a plurality of physical machines satisfying the aforementioned requirement exist, the white list generation unit 2040 may select any physical machine out of the physical machines.

The method of determining performance of hardware allocated to a machine 90 is not limited to the method of using the aforementioned coefficient α. For example, the white list generation unit 2040 may cause a physical machine to allocate every allocable hardware resource to a machine 90. However, in this case, the white list generation unit 2040 selects a physical machine allowing hardware performance of the machine 90 to be higher than the hardware performance of the target virtual machine 20. For example, as described above, when the CPU frequency and the memory capacity of the target virtual machine 20 are denoted by F and M, respectively, the white list generation unit 2040 selects a physical machine the CPU frequency and the memory capacity of which allocable to the machine 90 are greater than F and M, respectively.

Note that a machine 90 does not necessarily need to be newly generated, and a method of previously generating a machine 90 and changing the hardware configuration of the already-generated machine 90 may be employed. The reason is that a hardware configuration of a virtual machine can be changed after generation of the virtual machine. An existing technology can be used as a technology for changing a hardware configuration of a virtual machine after generation of the virtual machine.

Generation of White List 60: S106 and S108

The white list generation unit 2040 generates a white list 60 by using a machine 90. Specifically, the white list generation unit 2040 installs software being a target of a white list 60 (hereinafter referred to as target software) onto the machine 90 (S106). Subsequently, by scanning a storage apparatus in the machine 90, the white list generation unit 2040 generates a white list 60 indicating identification information of each file stored in the storage apparatus (S108).

A white list 60 may further include a hash value of a file in addition to identification information of the file. In this case, the white list generation unit 2040 computes a hash value of each file stored in the storage apparatus in the machine 90 and generates a white list 60 in which identification information of a file is associated with a hash value of the file. Note that it is assumed that a white list 60 includes only information of a specific type of file or a file under a specific directory. In this case, the white list generation unit 2040 may compute a hash value for only the target file out of files stored in the storage apparatus in the machine 90. A hash function used for computation of a hash value is previously stored in a storage apparatus accessible from the white list generation unit 2040.

Application of White List 60 to Target Virtual Machine 20: S216

The white list generation unit 2040 applies a generated white list 60 to a target virtual machine 20 (S216). "Applying a white list 60 to a target virtual machine 20" herein means entering a state in which "file access control performed in the target virtual machine 20 is performed by using the white list 60" (executing processing required for entering the state). For example, it is assumed that the target virtual machine 20 is configured to perform file access control with reference to a white list stored in a predetermined storage area. In this case, the white list generation unit 2040 stores a white list 60 into the aforementioned predetermined storage area. Thus, the target virtual machine 20 performs file access control by using the white list 60 generated by the white list generation unit 2040.

For example, access control using a white list 60 is performed as follows. First, when file access occurs on a target virtual machine 20, the target virtual machine 20 hooks the file access and determines whether the file access is permitted. For example, when the accessed file is not indicated in the white list 60, the target virtual machine 20 does not permit the file access and, when the accessed file is indicated in the white list 60, permits the file access.

It is assumed here that a hash value of the file is further indicated in the white list 60. In this case, the target virtual machine 20 computes a hash value of a file determined to be indicated in the white list 60 and determines whether the computed hash value matches the hash value indicated in the white list 60. When the computed hash value matches the hash value indicated in the white list 60, the target virtual machine 20 permits the file access. When the computed hash value does not match the hash value indicated in the white list 60, the target virtual machine 20 does not permit the file access.

Note that it is assumed that file access control is performed only on part of files. In this case, first, the target virtual machine 20 determines whether an accessed file is a target of access control. Then, the target virtual machine 20 performs access control using the white list 60 only when the file is determined to be a target of access control.

An existing technology can be used as a more specific technology for performing file access control with reference to a white list. Therefore, further description of the method for providing file access control is omitted.

Combined Use of Black List

A virtual machine operating in the virtual machine provision system 10 may perform access control by using a blacklist in addition to a white list. A blacklist is information determining unpermitted file access. A virtual machine operates in such a way as to permit only file access permitted in both a white list and a blacklist and not to permit file access not permitted in at least either list.

For example, a blacklist indicates identification information of a file access to which is not permitted. In this case, when identification information of an accessed file is indicated in the blacklist, a virtual machine does not permit the file access.

In addition, for example, a blacklist may indicate identification information of a file and a type of access not permitted for the file (such as one or more actions out of write, read, and execute). In this case, when identification information of an accessed file is indicated in a blacklist and the type of the access is a type not permitted in the blacklist, a virtual machine does not permit the file access.

Second Example Embodiment

Figure 8:
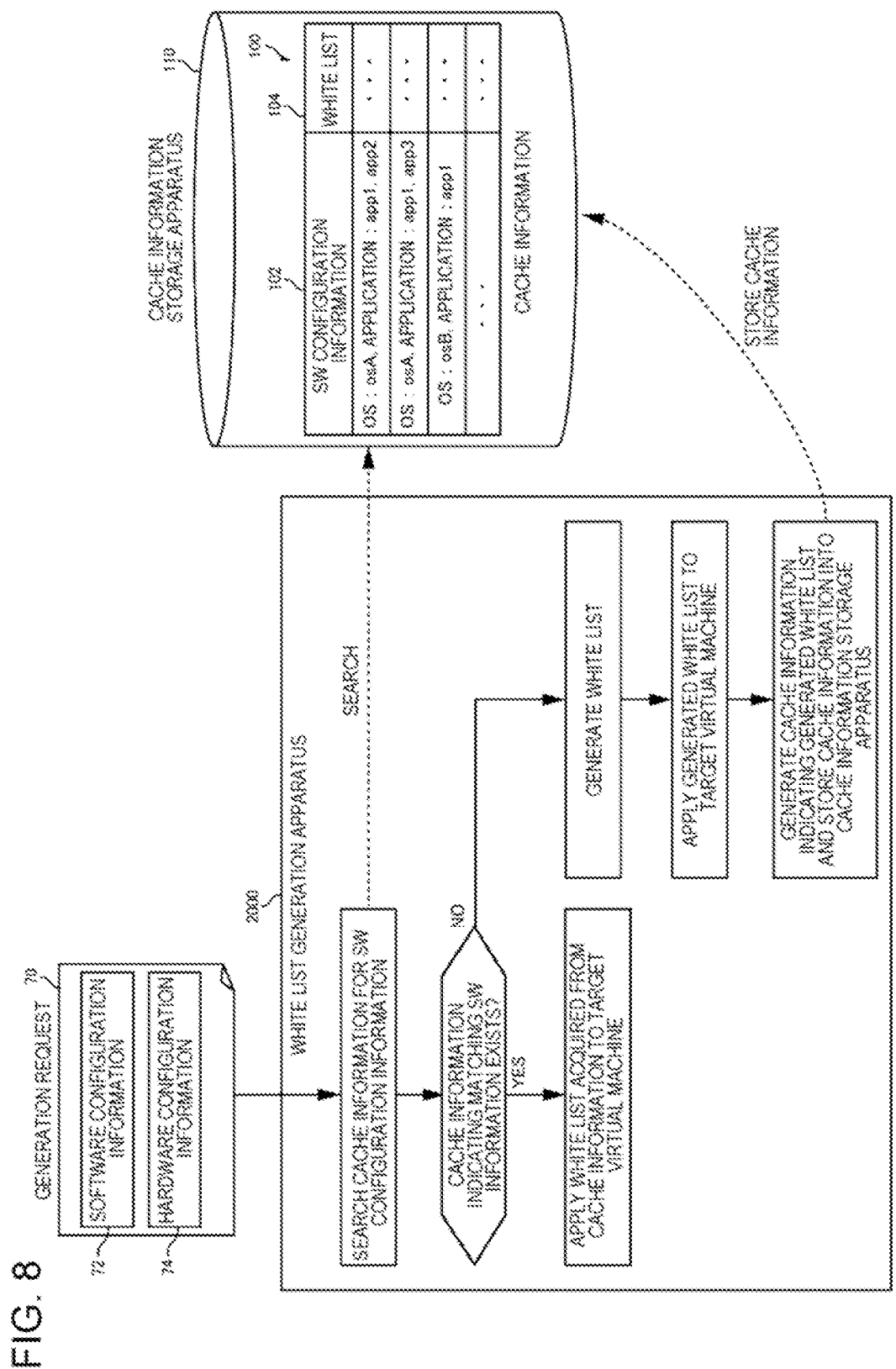
FIG. 8 is a diagram illustrating an outline of operation of a white list generation apparatus according to a second example embodiment.

FIG. 8 is a diagram illustrating an outline of operation of a white list generation apparatus 2000 according to a second example embodiment. The white list generation apparatus 2000 according to the second example embodiment has a function of causing a storage apparatus to store a generated white list 60 as a cache and allowing subsequent generation of the white list 60 to be omitted. In other words, when a white list 60 to be generated is stored as a cache, the white list generation apparatus 2000 omits generation of the white list 60 by reading and using the white list 60 stored as a cache.

A content of a white list 60 depends on target software. For example, it is assumed that an OS is target software. In this case, among a plurality of virtual machines installed with the same OS, files stored in storage apparatuses in the virtual machines by installation of the OS are the same, and therefore contents of white lists 60 are also the same. Accordingly, a white list 60 can be reused among a plurality of virtual machines installed with the same OS (that is, a plurality of virtual machines with common target software).

Then, the white list generation apparatus 2000 generating a white list 60 for a target virtual machine 20 generates cache information 100 for the white list 60 and stores the information into a cache information storage apparatus 110. The cache information 100 is information associating software configuration information 72 (identification information of target software installed on the target virtual machine 20) used for generation of the target virtual machine 20 with the generated white list 60. The cache information storage apparatus 110 is any storage apparatus accessible from the white list generation apparatus 2000.

Software configuration information and a white list that are indicated by cache information 100 are hereinafter referred to as software configuration information 102 and a white list 104, respectively. In other words, in cache information 100, software configuration information 72 acquired by an acquisition unit 2020 is used as software configuration information 102, and a white list 60 generated by a white list generation unit 2040 is used as a white list 104.

Note that it is assumed that a plurality of pieces of target software (such as an OS and an application) are installed on a target virtual machine 20. In this case, software configuration information 72 indicates identification information of each of the plurality of pieces of target software. Therefore, a white list is associated with a combination of pieces of identification information of the plurality of pieces of target software in cache information 100.

For example, a method of using cache information 100 by the white list generation apparatus 2000 is as follows. First, when acquiring a generation request 70, the white list generation apparatus 2000 searches the cache information storage apparatus 110 for software configuration information 72 included in the generation request 70. When cache information 100 indicating software configuration information 102 matching the software configuration information 72 exists, the white list generation apparatus 2000 applies a white list 104 indicated in the cache information 100 to the target virtual machine 20. In this case, the white list generation apparatus 2000 does not need to perform a series of processing operations (S104 and S106) for generating a white list 60 by using a machine 90.

On the other hand, when cache information 100 indicating software configuration information 102 matching the software configuration information 72 does not exist, the white list generation apparatus 2000 generates a white list 60 by the method described in the first example embodiment. Then, the white list generation apparatus 2000 generates cache information 100 for the generated white list 60 and stores the generated information into the cache information storage apparatus 110.

However, as will be described later, when a plurality of pieces of target software exist, cache information 100 matching only part of the pieces of target software (that is, cache information 100 indicating software configuration information 102 partially matching the software configuration information 72) may be utilized. The utilization method will be described later.

Advantageous Effect

In the white list generation apparatus 2000 according to the present example embodiment, when a white list 60 is generated, cache information 100 associating the white list 60 with software configuration information 72 is stored in the cache information storage apparatus 110. Then, when a software configuration of a subsequently generated target virtual machine 20 matches a software configuration of another target virtual machine 20 for which a white list 60 has been generated in the past, generation of the white list 60 is omitted by use of a white list 104 indicated in the cache information 100. Thus, the time required for generation of a white list can be further shortened, and therefore convenience of the target virtual machine 20 for a user 50 can be further increased.

The white list generation apparatus 2000 according to the present example embodiment will be described in more detail below.

Functional Configuration Example

Figure 9:
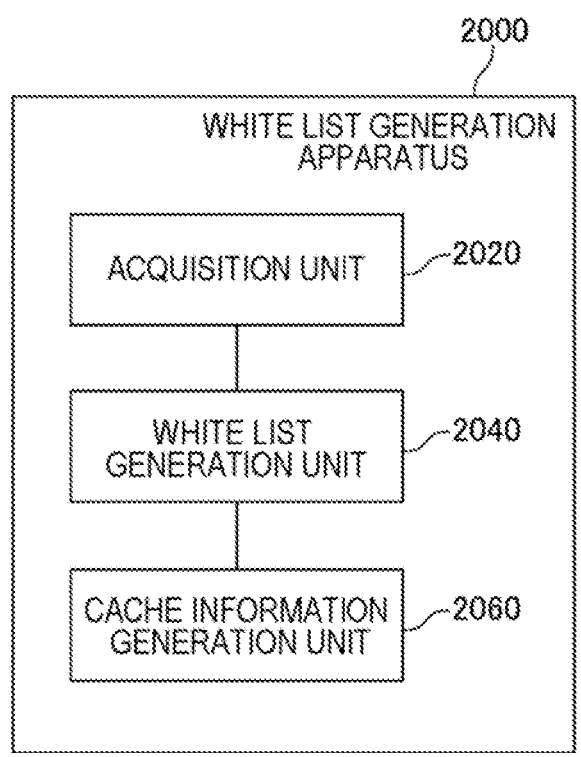
FIG. 9 is a diagram illustrating a functional configuration of the white list generation apparatus according to the second example embodiment.

FIG. 9 is a diagram illustrating a functional configuration of the white list generation apparatus 2000 according to the second example embodiment. The white list generation apparatus 2000 according to the second example embodiment further includes a cache information generation unit 2060. The cache information generation unit 2060 generates cache information 100 associating a white list 60 generated by the white list generation unit 2040 with software configuration information 72 and stores the generated cache information 100 into the cache information storage apparatus 110.

Further, the white list generation unit 2040 according to the second example embodiment determines whether cache information 100 indicating software configuration information 102 matching software configuration information 72 is stored in the cache information storage apparatus 110. When cache information 100 indicating software configuration information 102 matching the software configuration information 72 is stored in the cache information storage apparatus 110, the white list generation unit 2040 applies a white list 104 indicated in the cache information 100 to the target virtual machine 20. On the other hand, when cache information 100 indicating software configuration information 102 matching the software configuration information 72 is not stored in the cache information storage apparatus 110, the white list generation unit 2040 generates a white list 60 by the method described in the first example embodiment.

Hardware Configuration Example

For example, a hardware configuration of the white list generation apparatus 2000 according to the second example embodiment is represented by FIG. 4, similarly to the hardware configuration of the white list generation apparatus 2000 according to the first example embodiment. However, a storage device 1080 in the white list generation apparatus 2000 according to the second example embodiment stores a program module providing the function of the white list generation apparatus 2000 according to the second example embodiment.

Flow of Processing

Figure 10:
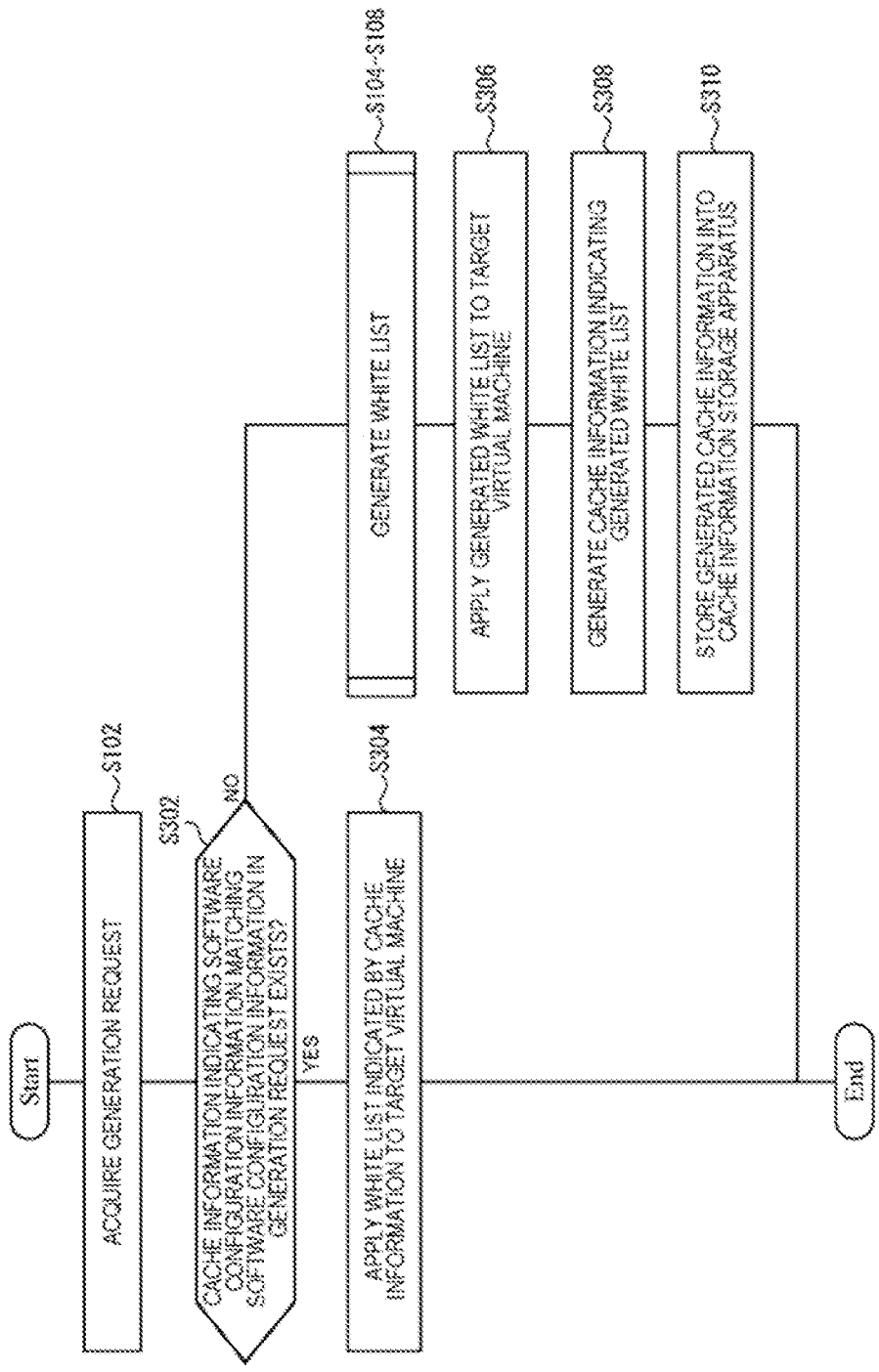
FIG. 10 is a flowchart illustrating a flow of processing executed by the white list generation apparatus according to the second example embodiment.

FIG. 10 is a flowchart illustrating a flow of processing executed by the white list generation apparatus 2000 according to the second example embodiment. When the acquisition unit 2020 acquires a generation request 70 (S102), the white list generation unit 2040 determines whether cache information 100 indicating software configuration information 102 matching software configuration information 72 exists by searching the cache information storage apparatus 110 for the software configuration information 72 (S302). When cache information 100 indicating software configuration information 102 matching the software configuration information 72 exists (S302: YES), the white list generation unit 2040 applies a white list 104 indicated in the cache information 100 to the target virtual machine 20 (S304).

On the other hand, when cache information 100 indicating software configuration information 102 matching the software configuration information 72 does not exist (S302: NO), the white list generation unit 2040 generates a white list 60 by the method described in the first example embodiment (S104 to S108). Then, the white list generation unit 2040 applies the generated white list 60 to the target virtual machine 20 (S306).

When a white list 60 is generated by the white list generation unit 2040, the cache information generation unit 2060 generates cache information 100 associating the software configuration information 72 with the white list 60 (S308) and stores the generated information into the cache information storage apparatus 110 (S310).

Case of Partial Match of Target Software

When cache information 100 indicating software configuration information 102 partially matching software configuration information 72 acquired by the acquisition unit 2020 exists, part of the cache information 100 may be utilized. Specifically, when cache information 100 indicating software configuration information 102 that "an OS matches the software configuration information 72 and part of applications match the software configuration information 72" exists, information about the matching application can be utilized. For example, such a case refers to a case that cache information 100 indicating "OS: osA, application: app1, app3" exists when the software configuration information 72 indicates "OS: osA, application: app1, app2." In this case, information about an application app1 can be utilized.

Specifically, a hash value of a file stored in a storage apparatus along with installation of a matching application can be used. The reason is that a content of a file stored in the storage apparatus by installation of a specific application is common regardless of a machine being a target of the installation as long as an OS is common. For example, with regard to the aforementioned example, a hash value indicated in a white list 60 in the cache information 100 can be used as a hash value for a file stored in the storage apparatus along with the installation of the application app1. Thus, hash value computation for part of the files can be omitted, and therefore the time required for generation of a white list 60 can be shortened.

For example, the white list generation unit 2040 operates as follows. First, when cache information 100 indicating software configuration information 102 matching software configuration information 72 does not exist, the white list generation unit 2040 searches for cache information 100 indicating software configuration information 102 partially matching the software configuration information 72. Specifically, the white list generation unit 2040 breaks down the software configuration information 72 into pairs of an OS and an application such as "OS, first application 1," "OS, second application 2," . . . and "OS, n-th application" (where n denotes the total number of applications indicated in the software configuration information 72) and, for each pair, searches for cache information 100 indicating software configuration information 102 including the pair.

It is assumed that, for a pair "OS, i-th application," cache information 100 indicating software configuration information 102 including the pair exists. In this case, the white list generation unit 2040 uses a hash value of a file indicated in a white list 104 in the cache information 100 for generation of a white list 60.

Specifically, the white list generation unit 2040 generates a white list 60 by the method described in the first example embodiment. At this time, prior to computation of a hash value of each file stored in a storage apparatus in a machine 90, whether identification information matching identification information of the file is indicated in the aforementioned white list 104 is determined. When identification information matching identification information of a certain file is indicated in the white list 104, the white list generation unit 2040 does not compute a hash value for the file and uses a hash value associated with the identification information of the file in the white list 104.

Modified Example

There may be a case that a plurality of target virtual machines 20 with white lists having the same content are generated in parallel. Examples of the case include the management server 40 receiving one generation request 70 requesting generation of a plurality of virtual machines with the same software configuration and the management server 40 receiving a plurality of generation requests 70 each requesting a virtual machine with the same software configuration at timings close to one another. The former is a case that the same user 50 requests a plurality of virtual machines with the same software configuration, and the latter is a case that users 50 different from one another request virtual machines with the same software configuration at timings close to one another.

Since software configurations are the same among a plurality of target virtual machines 20 in these cases, each of the plurality of target virtual machines 20 has a white list 60 with a common content. Therefore, generation of a white list 60 using a machine 90 does not need to be individually performed for each target virtual machine 20; and generation of a white list 60 may be performed only once, and the white list 60 may be copied and be applied to each target virtual machine 20. Thus, a computer resource required for generation of a white list 60 can be reduced.

Operation of the white list generation apparatus 2000 will be described below for each of 1) a case of receiving one generation request 70 requesting generation of a plurality of virtual machines with the same configuration and 2) a case of receiving a plurality of generation requests 70 each requesting a virtual machine with the same configuration at timings close to one another.

Case 1

In this case, a user 50 can transmit generation requests for a plurality of virtual machines in one generation request 70. For example, the number of virtual machines can be further specified in the input screen 80 in FIG. 7. Note that a plurality of virtual machines with the same software configuration but with hardware configurations different from one another may be requested.

The white list generation unit 2040 determines whether a plurality of target virtual machines 20 with the same software configuration are requested in a generation request 70. When a plurality of target virtual machines 20 with the same software configuration are requested, the white list generation unit 2040 determines a target virtual machine 20 with the highest requested hardware performance out of the plurality of target virtual machines 20 by using hardware configuration information 74 for each target virtual machine 20. The white list generation unit 2040 determines or generates a machine 90 having performance higher than the determined hardware performance and generates a white list 60 by using the machine 90. Then, the white list generation unit 2040 applies the generated white list 60 to each target virtual machine 20. Note that, when software configurations of a plurality of target virtual machines 20 requested by a generation request 70 are different from one another, generation of a white list 60 is performed for each target virtual machine 20.

Case 2

In this case of "receiving a plurality of generation requests 70 each requesting a virtual machine with the same configuration at timings close to one another," a case of "when a new generation request 70 is received, generation of a white list 60 for a target virtual machine 20 having the same software configuration as a software configuration indicated in the generation request 70 is currently under execution" may occur. In this case, the white list 60 currently being generated can be applied to a target virtual machine 20 to be generated based on the new generation request 70.

Then, for example, the white list generation apparatus 2000 operates as follows. The white list generation unit 2040 determines whether a target virtual machine 20 having the same software configuration as the software configuration indicated in the new generation request 70 exists in target virtual machines 20 for which white lists 60 are currently being generated. In order to achieve the determination, for example, information indicating a software configuration of each target virtual machine 20 for which a white list 60 is currently being generated is caused to be stored in a storage apparatus accessible from the white list generation unit 2040.

When a target virtual machine 20 having the same software configuration as the software configuration indicated in the new generation request 70 exists in the target virtual machines 20 for which white lists 60 are currently being generated, the white list generation unit 2040 does not generate a white list 60 based on the new generation request 70 and, when generation of the white list 60 currently being generated is completed, applies the white list 60 also to the target virtual machine 20 to be generated based on the new generation request 70. When a target virtual machine 20 having the same software configuration as the software configuration indicated in the new generation request 70 does not exist in the target virtual machines 20 for which white lists 60 are currently being generated, generation of a white list 60 using a machine 90 is executed for the new generation request 70.

Note that, when generation of a white list 60 for a target virtual machine 20 having the same software configuration as the software configuration indicated in the new generation request 70 is already completed, the aforementioned cache information 100 is generated for the white list 60. Therefore, generation of the white list can be omitted by using the cache information 100.

While the example embodiments of the present invention have been described above with reference to the drawings, the drawings are exemplifications of the present invention, and combinations of the aforementioned example embodiments or various configurations other than those described above may be employed.

A part or the whole of the aforementioned example embodiments may also be described as the following supplementary notes but is not limited thereto.

1. A white list generation apparatus including:
    an acquisition unit acquiring a generation request including hardware configuration information indicating hardware performance of a virtual machine and software configuration information indicating software to be installed on the virtual machine; and
    a white list generation unit generating a white list representing a file access to which is permitted in the virtual machine, wherein
    the white list generation unit installs software indicated in the acquired software configuration information onto a machine having hardware performance higher than hardware performance indicated in the hardware configuration information and generates the white list, based on a content of a storage apparatus in the machine after the installation.

2. The white list generation apparatus according to 1., wherein
    the white list generation unit applies the generated white list to a virtual machine having hardware performance indicated in the hardware configuration information and being installed with software indicated in the acquired software configuration information.

3. The white list generation apparatus according to 1. or 2., wherein
    the software configuration information indicates information determining an operating system, and
    the white list indicates a file stored in the storage apparatus after an operating system determined by the software configuration information is installed on the machine.

4. The white list generation apparatus according to 1. or 2., wherein
    the software configuration information indicates information determining an application, and
    the white list indicates a file stored in the storage apparatus after an application determined by the software configuration information is installed on the machine.

5. The white list generation apparatus according to any one of 1. to 4., wherein
    out of a plurality of physical machines, hardware performance varying for each physical machine, the white list generation unit determines a physical machine having hardware performance higher than hardware performance indicated in the hardware configuration information and generates the white list by using the determined physical machine.

6. The white list generation apparatus according to any one of 1. to 4., wherein
   the white list generation unit generates a virtual machine having hardware performance higher than hardware performance indicated in the hardware configuration information and generates the white list by using the generated virtual machine.

7. The white list generation apparatus according to any one of 1. to 6., further including
   a cache information generation unit storing, into a cache information storage apparatus, cache information associating the software configuration information with a white list generated for a machine installed with software indicated in the software configuration information, wherein,
   when a white list related to software configuration information included in the acquired generation request is stored in the cache information storage apparatus, the white list generation unit acquires the white list from the cache information storage apparatus and does not generate a white list.

8. The white list generation apparatus according to 7., wherein
   the white list indicates a hash value of a file access to which is permitted, and,
   when software configuration information indicating an operating system identical to an operating system indicated in software configuration information included in the acquired generation request and indicating an application matching one application indicated in software configuration information included in the acquired generation request exists in the software configuration information indicated by the cache information, the white list generation unit uses, in the white list generated for the virtual machine, a hash value of each file indicated by the white list associated with the relevant software configuration information.

9. A control method executed by a computer, the control method including:
   an acquisition step of acquiring a generation request including hardware configuration information indicating hardware performance of a virtual machine and software configuration information indicating software to be installed on the virtual machine; and
   a white list generation step of generating a white list representing a file access to which is permitted in the virtual machine, wherein
   the white list generation step installs software indicated in the acquired software configuration information onto a machine having hardware performance higher than hardware performance indicated in the hardware configuration information and generates the white list, based on a content of a storage apparatus in the machine after the installation.

10. The control method according to 9., wherein
    the white list generation step applies the generated white list to a virtual machine having hardware performance indicated in the hardware configuration information and being installed with software indicated in the acquired software configuration information.

11. The control method according to 9. or 10., wherein
    the software configuration information indicates information determining an operating system, and
    the white list indicates a file stored in the storage apparatus after an operating system determined by the software configuration information is installed on the machine.

12. The control method according to 9. or 10., wherein
    the software configuration information indicates information determining an application, and
    the white list indicates a file stored in the storage apparatus after an application determined by the software configuration information is installed on the machine.

13. The control method according to any one of 9. to 12., wherein
    out of a plurality of physical machines hardware performance varying for each physical machine, the white list generation step determines a physical machine having hardware performance higher than hardware performance indicated in the hardware configuration information and generates the white list by using the determined physical machine.

14. The control method according to any one of 9. to 12., wherein
    the white list generation step generates a virtual machine having hardware performance higher than hardware performance indicated in the hardware configuration information and generates the white list by using the generated virtual machine.

15. The control method according to any one of 9. to 14., further including
    a cache information generation step of storing, into a cache information storage apparatus, cache information associating the software configuration information with a white list generated for a machine installed with software indicated in the software configuration information, wherein,
    when a white list related to software configuration information included in the acquired generation request is stored in the cache information storage apparatus, the white list generation step acquires the white list from the cache information storage apparatus and does not generate a white list.

16. The control method according to 15., wherein
    the white list indicates a hash value of a file access to which is permitted, and,
    when software configuration information indicating an operating system identical to an operating system indicated in software configuration information included in the acquired generation request and indicating an application matching one application indicated in software configuration information included in the acquired generation request exists in the software configuration information indicated by the cache information, the white list generation step uses, in the white list generated for the virtual machine, a hash value of each file indicated by the white list associated with the relevant software configuration information.

17. A program causing a computer to execute each step included in the control method according to any one of 9. to 16.

This application is based upon and claims the benefit of priority from Japanese patent application No. 2019-044977, filed on Mar. 12, 2019, the disclosure of which is incorporated herein in its entirety by reference.

REFERENCE SIGNS LIST

10 Virtual machine provision system
20 Target virtual machine
30 Target physical machine
40 Management server
50 User
52 User terminal
60 White list
70 Generation request
72 Software configuration information
74 Hardware configuration information
80 Input screen
82 Input area
84 Input area
90 Machine
100 Cache information
102 Software configuration information
104 White list
110 Cache information storage apparatus
1000 Computer
1020 Bus
1040 Processor
1060 Memory
1080 Storage device
1100 Input-output interface
1120 Network interface
2000 White list generation apparatus
2020 Acquisition unit
2040 White list generation unit
2060 Cache information generation unit

What is claimed is:

1. A white list generation apparatus comprising:
at least one memory configured to store instructions; and
at least one processor configured to execute the instructions to:
acquire a generation request including hardware configuration information of a target virtual machine and software configuration information indicating software to be installed on the target virtual machine, the hardware configuration information determining processing performance of each piece of virtual hardware constituting the target virtual machine; and
generate a white list representing a file access to which is permitted in the target virtual machine, wherein
generating the white list includes
determining a white list generation machine being a physical machine using the hardware configuration information or generating a white list generation machine being a virtual machine using the hardware configuration information,
installing software indicated in the acquired software configuration information onto the determined or generated white list generation machine, and
generating the white list, based on a content of a storage apparatus in the determined or generated white list generation machine after the installation, and wherein
the hardware configuration information includes information including an index value relating to a performance of target hardware required for the white list generation machine, and
the target hardware of the determined or generated white list generation machine has a hardware performance higher than the performance indicated by the index value.

2. The white list generation apparatus according to claim 1, wherein
the white list generation unit applies the generated white list to a virtual machine having hardware performance indicated in the hardware configuration information and being installed with software indicated in the acquired software configuration information.

3. The white list generation apparatus according to claim 1, wherein
the software configuration information indicates information determining an operating system, and
the white list indicates a file stored in the storage apparatus after an operating system determined by the software configuration information is installed on the machine.

4. The white list generation apparatus according to claim 1, wherein
the software configuration information indicates information determining an application, and
the white list indicates a file stored in the storage apparatus after an application determined by the software configuration information is installed on the machine.

5. The white list generation apparatus according to claim 1, further comprising
a cache information generation unit storing, into a cache information storage apparatus, cache information associating the software configuration information with a white list generated for a machine installed with software indicated in the software configuration information, wherein,
when a white list related to software configuration information included in the acquired generation request is stored in the cache information storage apparatus, the white list generation unit acquires the white list from the cache information storage apparatus and does not generate a white list.

6. The white list generation apparatus according to claim 5, wherein
the white list indicates a hash value of a file access to which is permitted, and,
when software configuration information indicating an operating system identical to an operating system indicated in software configuration information included in the acquired generation request and indicating an application matching one application indicated in software configuration information included in the acquired generation request exists in the software configuration information indicated by the cache information, the white list generation unit uses, in the white list generated for the virtual machine, a hash value of each file indicated by the white list associated with the relevant software configuration information.

7. A control method executed by a computer, the control method comprising:
acquiring a generation request including hardware configuration information of a target virtual machine and software configuration information indicating software to be installed on the target virtual machine, the hardware configuration information includes information determining processing performance of each piece of virtual hardware constituting the target virtual machine; and
generating a white list representing a file access to which is permitted in the target virtual machine, wherein
generating the white list includes
determining a white list generation machine being a physical machine using the hardware configuration information or generating a white list generation machine being a virtual machine using the hardware configuration information, installing software indicated in the acquired software configuration information onto the determined or generated white list generation machine and generating the white list, based on a content of a storage apparatus in the determined or generated white list generation machine after the installation, and wherein the hardware configuration information includes information including an index value relating to a performance of target hardware required for the white list generation machine, and the target hardware of the determined or generated white list generation machine has a hardware performance higher than the performance indicated by the index value.

8. The control method according to claim 7, wherein the white list generation step applies the generated white list to a virtual machine having hardware performance indicated in the hardware configuration information and being installed with software indicated in the acquired software configuration information.

9. The control method according to claim 7, wherein the software configuration information indicates information determining an operating system, and the white list indicates a file stored in the storage apparatus after an operating system determined by the software configuration information is installed on the machine.

10. The control method according to claim 7, wherein the software configuration information indicates information determining an application, and the white list indicates a file stored in the storage apparatus after an application determined by the software configuration information is installed on the machine.

11. The control method according to claim 7, further comprising a cache information generation step storing, into a cache information storage apparatus, cache information associating the software configuration information with a white list generated for a machine installed with software indicated in the software configuration information, wherein, when a white list related to software configuration information included in the acquired generation request is stored in the cache information storage apparatus, the white list generation step acquires the white list from the cache information storage apparatus and does not generate a white list.

12. The control method according to claim 11, wherein the white list indicates a hash value of a file access to which is permitted, and, when software configuration information indicating an operating system identical to an operating system indicated in software configuration information included in the acquired generation request and indicating an application matching one application indicated in software configuration information included in the acquired generation request exists in the software configuration information indicated by the cache information, the white list generation step uses, in the white list generated for the virtual machine, a hash value of each file indicated by the white list associated with the relevant software configuration information.

13. A non-transitory computer readable medium storing a program causing a computer to execute instructions to:

acquire a generation request including hardware configuration information of a target virtual machine and software configuration information indicating software to be installed on the target virtual machine, the hardware configuration information includes information determining processing performance of each piece of virtual hardware constituting the target virtual machine; and generate a white list representing a file access to which is permitted in the target virtual machine, wherein generating the white list includes determining a white list generation machine being a physical machine using the hardware configuration information or generating a white list generation machine being a virtual machine using the hardware configuration information, installing software indicated in the acquired software configuration information onto the determined or generated white list generation machine, and generating the white list, based on a content of a storage apparatus in the determined or generated white list generation machine after the installation, and wherein the hardware configuration information includes information including an index value relating to a performance of target hardware required for the white list generation machine, and the target hardware of the determined or generated white list generation machine has a hardware performance higher than the performance indicated by the index value.

* * * * *